(12) United States Patent
Lee et al.

(10) Patent No.: US 8,479,073 B2
(45) Date of Patent: Jul. 2, 2013

(54) METHOD OF TRANSMITTING AND RECEIVING ARQ FEEDBACK INFORMATION

(75) Inventors: Eun Jong Lee, Gyeonggi-do (KR); Ki Seon Ryu, Gyeonggi-do (KR); Doo Hyun Sung, Gyeonggi-do (KE); Yong Ho Kim, Gyeonggi-do (KR); Young Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 12/700,508

(22) Filed: Feb. 4, 2010

(65) Prior Publication Data

US 2010/0205500 A1    Aug. 12, 2010

Related U.S. Application Data

(60) Provisional application No. 61/149,993, filed on Feb. 4, 2009, provisional application No. 61/159,436, filed on Mar. 11, 2009, provisional application No. 61/173,573, filed on Apr. 28, 2009.

(30) Foreign Application Priority Data

Aug. 18, 2009  (KR) ................. 10-2009-0076280

(51) Int. Cl.
 H04L 1/18  (2006.01)
 G08C 25/02  (2006.01)
(52) U.S. Cl.
 USPC .......................................... 714/748

(58) Field of Classification Search
 USPC ................................... 714/748–750
 See application file for complete search history.

(56) References Cited

U.S. PATENT DOCUMENTS

| | | | |
|---|---|---|---|
| 7,000,021 B1 * | 2/2006 | Radhakrishnan et al. | 709/230 |
| 7,757,148 B2 * | 7/2010 | Schaap et al. | 714/748 |
| 2005/0201378 A1 | 9/2005 | Ludwig et al. | |
| 2005/0276266 A1 | 12/2005 | Terry | |
| 2007/0297325 A1 | 12/2007 | Larsson | |
| 2008/0279211 A1 | 11/2008 | Chitrapu et al. | |
| 2009/0028126 A1 | 1/2009 | Meylan | |

OTHER PUBLICATIONS

Fantacci et al., Performance evaluation of Pooling systems for wireless local communication networks, Nov. 2000, IEEE Trans. on Vehicular Tech., vol. 49, No. 6, p. 2148-2157.*
European Patent Office Application Serial No. 10738745.8, Search Report dated Dec. 20, 2012, 6 pages.

* cited by examiner

Primary Examiner — Shelly A Chase
(74) Attorney, Agent, or Firm — Lee, Hong, Degerman, Kang & Waimey

(57) ABSTRACT

A method of transmitting and receiving Automatic Repeat reQuest (ARQ) feedback information in a wireless communication system is disclosed. The method of transmitting ARQ feedback information in a wireless communication system includes, at a transmitter, transmitting a Protocol Data Unit (PDU) including an extended header including an ARQ feedback Polling Request (APR) field indicating whether or not the transmitter makes a request for ARQ feedback polling, and receiving an Acknowledgement (ACK) from a receiver if the APR field indicates that the transmitter makes the request for ARQ feedback polling to the receiver.

19 Claims, 32 Drawing Sheets

| Flow ID (4) | | | EH (1) | Length (3) | | |
|---|---|---|---|---|---|---|
| Length (8) | | | | | | |

FIG. 6

| Last | Type [length TBD] | | | TBD | |
|---|---|---|---|---|---|
| Body Contents (variable length) | | | | | |

| SN (8) | | | | | |
|---|---|---|---|---|---|
| SN (2) | FC (2) | AFI (1) | APR (1) | End (1) | Rsvd or LEN (1) |
| Length (8) | | | | | |
| Length (2) | End (1) | Rsvd or Length (6) | | | |

FIG. 16

| L (1) | Type (5) | AFI (1) | TBD (1) |
|---|---|---|---|
| MEHB (for connection 1) | | | |
| ... | | | |
| MEHB (for connection n) | | | |

FIG. 17

| M (1) | FlowID(4) | | | FC (2) | | SN (1) |
|---|---|---|---|---|---|---|
| SN (8) | | | | | | |
| SN (1) | APR (1) | Last (1) | Length for the 1st SDU (5) | | | |
| Length for the 1st SDU (6) | | | | | | Last (1) |

| SN: 10 | 11 | 12 | 13 | 14 | 15 | 16 | 17 | 18 | 19 | 20 |
|---|---|---|---|---|---|---|---|---|---|---|
| A | A | N | A | A | A | N | A | A | N | A |

FIG. 28

| LAST (1) | FPI (=0) | EH Type = ARQ feedback | | | | |
|---|---|---|---|---|---|---|
| Cumulative ACK_SN (8) ||||||||
| Cumulative ACK_SN (2) | Num of NACK (8) | | | | | |
| Selective NACK |||||||

FIG. 29

| LAST (1) | EH Type = ARQ feedback | | | | | |
|---|---|---|---|---|---|---|
| Cumulative ACK_SN (8) |||||||
| Cumulative ACK_SN (2) | Num of NACK (6) | | | | | |
| Selective NACK |||||||

FIG. 30

| NACK_SN_1 | NACK_SN_2 | ⋯ | NACK_SN_n |

FIG. 31

| NACK_SN_1 | E1 | Offset/RSN start, end | NACK_SN_2 | E1 | ⋯ | NACK_SN_n | E1 |

If E1 is set to 1

FIG. 33

| LAST (1) | FPI (=0) | EH Type = ARQ feedback |||||
|---|---|---|---|---|---|---|
| Cumulative ACK_SN (8) |||||||
| Cumulative ACK_SN (2) | END (1) | Selective NACK |||||

FIG. 34

| LAST (1) | EH Type = ARQ feedback ||||||
|---|---|---|---|---|---|---|
| Cumulative ACK_SN (8) |||||||
| Cumulative ACK_SN (2) | END (1) | Selective NACK |||||

METHOD OF TRANSMITTING AND RECEIVING ARQ FEEDBACK INFORMATION

CROSS-REFERENCE TO RELATED APPLICATIONS

Pursuant to 35 U.S.C. §119(e), this application claims the benefit of priority to Provisional Application No. 61/149,993, filed on Feb. 4, 2009, Provisional Application No. 61/159,436, filed on Mar. 11, 2009, Provisional Application No. 61/173,573, filed on Apr. 28, 2009 and, pursuant to 35 U.S.C. §119(a), this application claims the benefit of earlier filing date and right of priority to Korean application No. 10-2009-0076280, filed on Aug. 18, 2009, the contents of all of which are incorporated by reference herein in their entirety.

BACKGROUND OF THE INVENTION

1. Field of the Invention

The present invention relates to a wireless communication system, and more particularly, to a method of transmitting and receiving Automatic Repeat reQuest (ARQ) feedback information in a wireless communication system.

2. Discussion of the Related Art

First, the format of a Medium Access Control (MAC) Protocol Data Unit (PDU) of the related art and the format of a generic MAC header will be described with reference to FIGS. 1 and 2.

FIG. 1 is a diagram showing the format of the MAC PDU of the related art and FIG. 2 is a diagram showing the format of the generic MAC header of the related art.

Referring to FIG. 1, the MAC PDU includes a generic MAC header, a payload and a Cyclic Redundancy Check (CRC).

The generic MAC header is a part in which control information is carried, the payload is a part in which actual information excluding a header for various operations and control is carried, and the CRC is a part in which a result extracted from data by a polynomial equation at a transmitter side is carried for error check.

Referring to FIG. 2, an HT field indicates a header type. The generic MAC header of the related art is roughly divided into two header types according to presence/absence of the payload, and the HT field indicates the header type of the generic MAC header. The value of the HT field is set to 0 if the generic MAC header has a payload and the value of the HT field is set to 1 if the generic MAC header does not have a payload.

The generic MAC header which does not have the payload is used for signaling information transmission, and examples of the type of the signaling header defined in the related art include a MAC signaling header type 1 and a MAC signaling header type 2. The MAC signaling header type 1 includes a bandwidth (BW) request, a bandwidth request and uplink transmission power report (BR and UL Tx power report), a carrier-to-interference-noise ratio (CINR) report, and a physical channel report, and the MAC signaling header type 2 includes a feedback header.

A Type field indicates whether or not MAC subheaders are transmitted. In the related art, six MAC subheaders are defined, and the Type field has 6 bits, each of which indicates whether or not each of the subheaders is present.

The six MAC subheaders defined in the related art include a Fragmentation Subheader (FSH), a Grant management Subheader (GMSH), a Packing Subheader (PSH), an Automatic Repeat reQuest (ARQ) feedback subheader, a Mesh subheader and a Fast-Feedback Allocation Subheader (FFSH).

Next, the FSH and the PSH will be described with reference to FIGS. 3 and 4.

FIG. 3 is a diagram showing a method of adding a FSH and a PSH in the case of ARQ-enabled connection.

As shown in FIG. 3, in the case where only a service Data Unit (SDU) which is not fragmented is transmitted or in the case where one fragment of the SDU is transmitted by fragmentation, the FSH is added in front of the SDU or the fragment of the SDU. In the case where SDU fragments generated from different SDUs of the same connection are transmitted together, the PSH is added in front of each of the SDUs or the fragments of the SDUs.

FIG. 4 is a diagram showing a method of adding a FSH and a PSH in the case of non-ARQ-enabled connection.

As shown in FIG. 4, no subheader is added in the case where only the SDU which is not fragmented is transmitted, and the FSH is added in front of the fragment of the SDU for packet reordering of a receiver if only one fragment of the SDU is transmitted by fragmentation. In the case where SDU fragments generated from different SDUs of the same connection are transmitted together, the PSH is added in front of each of the SDUs or the SDU fragments.

The FSH of the related art includes a 2-bit Fragmentation Control (FC) field indicating whether or not fragmentation is performed and an 11-bit Sequence Number (SN) field, and the PSH includes an FC field, an SC field and an 11-bit length (LEN) field.

Next, an ARQ feedback method of the related art will be described.

In the related art, when a receiver receives an ARQ-enabled PDU, the receiver transmits acknowledgement (ACK) or Negative Acknowledgement (NACK) through an ARQ feedback Information Element (IE). That is, the ACK or NACK of all transmitted ARQ-enabled PDUs is transmitted by the receiver according to ARQ feedback types. The ARQ feedback is transmitted in the payload format by the ARQ feedback IE, transmission of the ARQ feedback payload is indicated by a fourth bit of the Type field of the generic MAC header, and the ARQ feedback IE is located at a first location of packed SDUs or SDU fragments when being packed together with other MAC SDUs.

However, recently, according to an IEEE 802.16m system which is being standardized, a transmitter may transmit an ARQ feedback polling request to a receiver, and the receiver transmits an ARQ feedback to the transmitter if the ARQ feedback polling request is received from the transmitter or if an ARQ block is not received in a predetermined period.

Accordingly, there is a need for a method of, at a transmitter, transmitting an ARQ feedback polling request to a receiver and an ARQ feedback transmission indication method of indicating whether or not a receiver transmits an ARQ feedback to a transmitter.

As described above, according to the related art, an ARQ feedback polling request method and an ARQ feedback transmission indication method are not defined. However, according to the IEEE 802.16m system, there is a need for an ARQ feedback polling request method and an ARQ feedback transmission indication method.

SUMMARY OF THE INVENTION

Accordingly, the present invention is directed to a method of transmitting and receiving Automatic Repeat reQuest (ARQ) feedback information in a wireless communication system that substantially obviates one or more problems due to limitations and disadvantages of the related art.

An object of the present invention is to provide an ARQ feedback polling request method and an ARQ feedback transmission indication method capable of reducing overhead.

Another object of the present invention is to provide a method of receiving an Automatic Repeat reQuest (ARQ) feedback at a transmitter in a wireless communication system.

Another object of the present invention is to provide a method of transmitting an Automatic Repeat reQuest (ARQ) feedback at a receiver in a wireless communication system.

A further object of the present invention is to provide a method of transmitting Automatic Repeat reQuest (ARQ) feedback information at a transmitter in a wireless communication system.

A further object of the present invention is to provide a method of receiving an Automatic Repeat reQuest (ARQ) feedback at a transmitter in a wireless communication system.

A further object of the present invention is to provide a method of transmitting an Automatic Repeat reQuest (ARQ) feedback at a receiver in a wireless communication system.

A further object of the present invention is to provide a transmitter apparatus for receiving an Automatic Repeat reQuest (ARQ) feedback from a receiver in a wireless communication system.

A further object of the present invention is to provide a receiver apparatus for transmitting an Automatic Repeat reQuest (ARQ) feedback in a wireless communication system.

A further object of the present invention is to provide a transmitter apparatus for transmitting Automatic Repeat reQuest (ARQ) feedback information in a wireless communication system.

A further object of the present invention is to provide a transmitter apparatus for receiving Automatic Repeat reQuest (ARQ) feedback in a wireless communication system.

A further object of the present invention is to provide a receiver apparatus for transmitting an Automatic Repeat reQuest (ARQ) feedback in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving an Automatic Repeat reQuest (ARQ) feedback at a transmitter in a wireless communication system includes transmitting a Protocol Data Unit (PDU) including an extended header including an ARQ feedback Polling (AFP) field or a Type field indicating whether or not the transmitter makes a request for ARQ feedback polling to a receiver, and receiving the ARQ feedback from the receiver when the AFP field or the Type field indicates that the transmitter makes the request for ARQ feedback polling to the receiver.

In another aspect of the present invention, a method of transmitting an Automatic Repeat reQuest (ARQ) feedback at a receiver in a wireless communication system includes receiving a Protocol Data Unit (PDU) including an extended header including an ARQ Feedback Polling (AFP) field or a Type field indicating whether or not a transmitter makes a request for ARQ feedback polling from the transmitter, and transmitting the ARQ feedback to the transmitter when the AFP field or the Type field indicates that the transmitter makes the request for ARQ feedback polling to the receiver.

In another aspect of the present invention, a method of transmitting ARQ feedback information at a transmitter in a wireless communication system includes generating a PDU including a Multiplexing Extended Header (MEH) including an AFI field and Multiplexing Extended Header Blocks (MEHBs), and transmitting the generated PDU to a receiver. The AFI field indicates whether or not the PDU includes an ARQ feedback IE, and the MEHBs include information about Service Data Units (SDUs) or SDU fragments included in the same connection.

The MEHBs may include an APR field indicating whether or not the transmitter requests an ARQ feedback to the receiver with respect to a corresponding connection.

If the AFI field indicates that the PDU includes the ARQ feedback IE, the MEH includes the ARQ feedback IE.

In another aspect of the present invention, a method of receiving an Automatic Repeat reQuest (ARQ) feedback at a transmitter in a wireless communication system includes transmitting a Protocol Data Unit (PDU) including an extended header including a Type field indicating whether or not the transmitter makes a request for ARQ feedback polling to a receiver, and receiving the ARQ feedback from the receiver if the Type field indicates that the transmitter makes the request for ARQ feedback polling to the receiver.

In another aspect of the present invention, a method of transmitting an Automatic Repeat reQuest (ARQ) feedback at a receiver in a wireless communication system includes receiving an ARQ feedback poll for requesting ARQ feedback polling from a transmitter, and transmitting to the transmitter a Protocol Data Unit (PDU) including an extended header including a Type field indicating whether or not the ARQ feedback is transmitted in response to the ARQ feedback polling request.

In another aspect of the present invention, a transmitter apparatus for receiving an Automatic Repeat reQuest (ARQ) feedback from a receiver in a wireless communication system includes a transmitting unit configured to transmit a Protocol Data Unit (PDU) including an extended header including an ARQ feedback Polling (AFP) field or a Type field indicating whether or not the transmitter makes a request for ARQ feedback polling to the receiver, and a receiving unit configured to the ARQ feedback from the receiver if the AFP field or the Type field indicates that the transmitter makes the request for ARQ feedback polling to the receiver.

In another aspect of the present invention, a receiver apparatus for transmitting an Automatic Repeat reQuest (ARQ) feedback in a wireless communication system includes a receiving unit configured to receive a Protocol Data Unit (PDU) including an extended header including an ARQ Feedback Polling (AFP) field or a Type field indicating whether or not a transmitter makes a request for ARQ feedback polling from the transmitter, and a transmitting unit configured to transmit the ARQ feedback to the transmitter if the AFP field or the Type field indicates that the transmitter makes the request for ARQ feedback polling to the receiver.

In another aspect of the present invention, a transmitter apparatus for transmitting Automatic Repeat reQuest (ARQ) feedback information in a wireless communication system includes a PDU generating unit configured to generate a Protocol Data Unit (PDU) including a Multiplexing Extended Header (MEH) including an ARQ Feedback Information Element (IE) Indication (AFI) field and Multiplexing Extended Header Blocks (MEHBs), and a transmitting unit configured to transmit the generated PDU to a receiver, wherein the AFI field indicates whether or not the PDU includes an ARQ feedback IE, and the MEHBs include information about Service Data Units (SDUs) or SDU fragments included in the same connection.

In another aspect of the present invention, a transmitter apparatus for receiving Automatic Repeat reQuest (ARQ) feedback in a wireless communication system includes a transmitting unit configured to transmit a Protocol Data Unit (PDU) including an extended header including a Type field indicating whether or not the transmitter makes a request for ARQ feedback polling to a receiver, and a receiving unit configured to receive the ARQ feedback from the receiver if the Type field indicates that the transmitter makes the request for ARQ feedback polling to the receiver.

In another aspect of the present invention, a receiver apparatus for transmitting an Automatic Repeat reQuest (ARQ) feedback in a wireless communication system includes a receiving unit configured to receive an ARQ feedback poll for requesting ARQ feedback polling from a transmitter, and a transmitting unit configured to the transmit a Protocol Data Unit (PDU) including an extended header including a Type field indicating whether or not ARQ feedback is transmitted in response to the ARQ feedback polling request.

According to the embodiments of the present invention, it is possible to provide an ARQ feedback polling request method and an ARQ feedback transmission indication method, which are capable of reducing overhead by adding an APR field or an AFI field.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram showing the format of a generic MAC header of a wireless communication system;

FIG. 6 is a diagram showing the format of an extended header of a wireless communication system;

FIG. 15 is a diagram showing an FPEH including an AFI field and an APR field according to an embodiment of the present invention;

FIG. 16 is a diagram showing a Multiplexing Extended Header (MEH) according to an embodiment of the present invention;

FIG. 17 is a diagram showing a Multiplexing Extended Header Block (MEHB) according to an embodiment of the present invention;

FIGS. 28 and 29 are diagrams showing the other examples of the ARQ feedback extended header format;

FIG. 30 is a diagram showing a first example of a selective NACK;

FIG. 31 is a diagram showing a second example of the selective NACK;

FIGS. 33 and 34 are diagrams showing the other examples of the ARQ feedback extended header format;

DETAILED DESCRIPTION OF THE INVENTION

Figure 1:
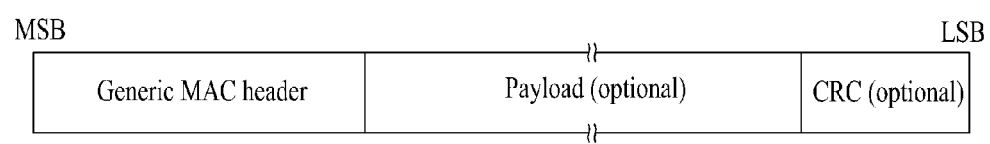
FIG. 1 is a diagram showing the format of a Medium Access Control (MAC) Protocol Data Unit (PDU) of the related art.
Figure 2:
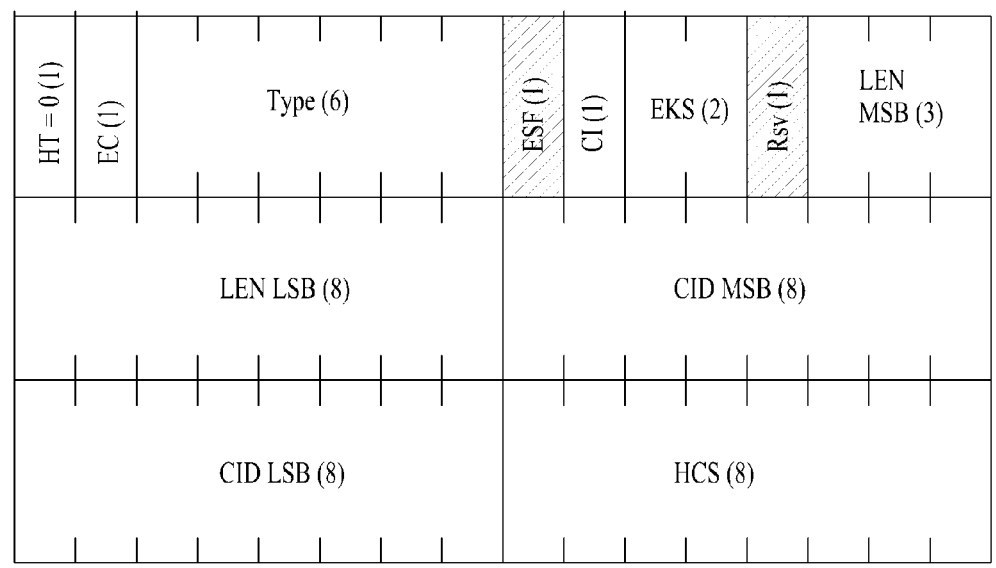
FIG. 2 is a diagram showing the format of a generic MAC header of the related art.
Figure 3:
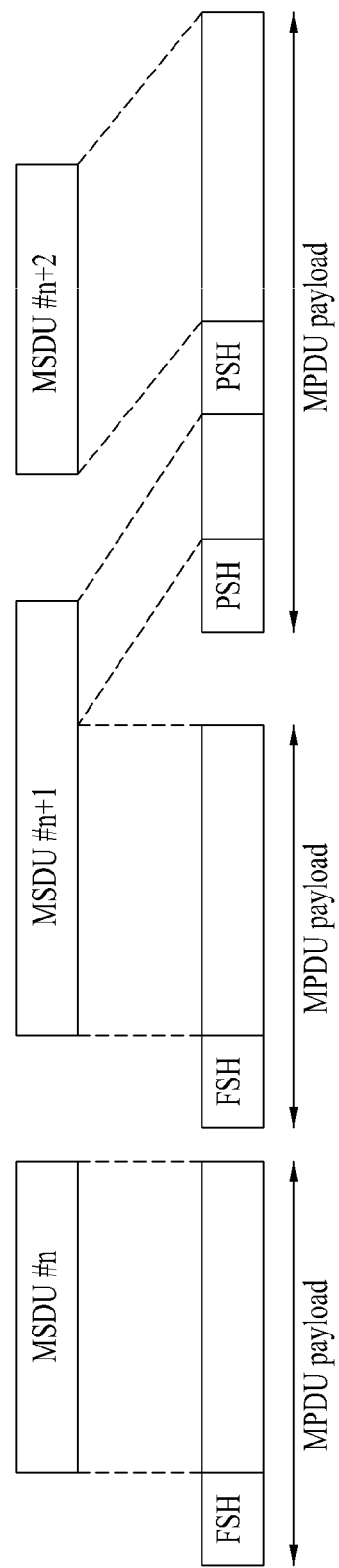
FIG. 3 is a diagram showing a method of adding a FSH and a PSH in the case of ARQ-enabled connection.
Figure 4:
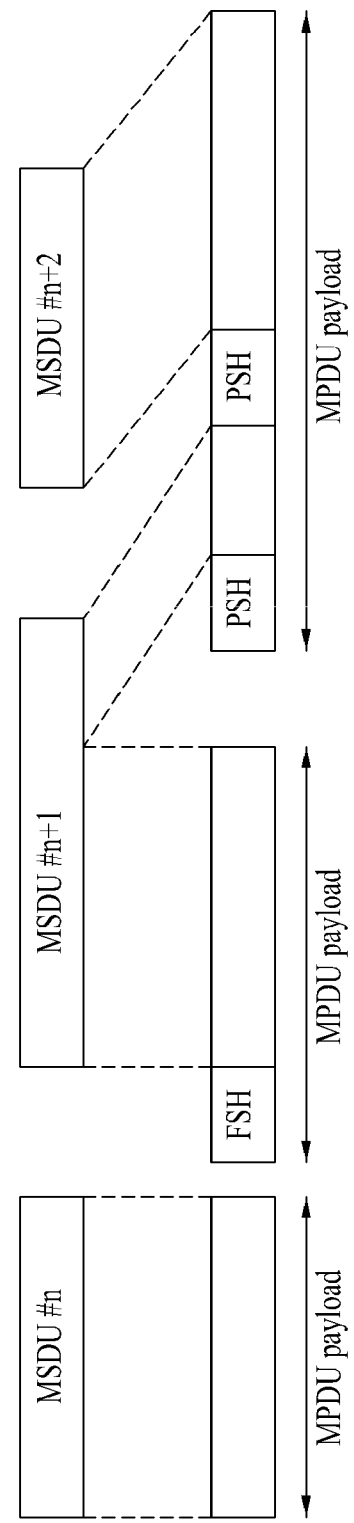
FIG. 4 is a diagram showing a method of adding a FSH and a PSH in the case of non-ARQ-enabled connection.

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals in the entire specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

First, a generic Medium Access Control (MAC) header, an extended header, a fragmentation and packing extended header of a wireless communication system according to an embodiment of the present invention will be described with reference to FIGS. 5 to 7.

FIG. 5 is a diagram showing the format of a generic MAC header of a wireless communication system. As shown in FIG. 5, the generic MAC header includes a flow ID field, an Extended Header (EH) field and a length field.

The flow ID field indicates an identifier (ID) of flow connection, the EH field indicates whether or not an extended header is additionally postfixed to the generic MAC header. The EH field is set to "1" if the extended header is additionally postfixed to the generic MAC header and is set to "0" if the extended header is not additionally postfixed to the generic MAC header. The length field indicates the length of a MAC PDU or the length of a payload which follows a header.

In the related art, if an ARQ feedback payload including one or more ARQ feedback IEs is present in a transmitted MAC PDU, a receiver sets a fourth bit of a Type field of the generic MAC header to 1 and notifies a transmitter of whether or not an ARQ feedback IE is present in the MAC PDU.

However, in an IEEE 802.16m system, unlike the related art based on a connection ID (CID), since data transmission based on a station ID (STID) and a flow ID (FID) is basically performed and the generic MAC header with the format shown in FIG. 5 is used, there is a need for a method of indicating whether or not an ARQ feedback IE is present in a MAC PDU.

In the wireless communication system according to the embodiment of the present invention, necessary fields other than the flow ID and the length are transmitted through an extended header which may be added to the generic MAC header.

FIG. 6 is a diagram showing the format of the extended header of the wireless communication system. As shown in FIG. 6, the extended header includes a Last field, a Type field and a Body Contents field.

The Last field indicates whether or not another type of extended header is postfixed to the extended header, that is, whether or not the extended header is a last extended header. The Type field indicates the type of the extended header, and the Body Contents field indicates the contents of the extended header defined according to types.

Figure 7:
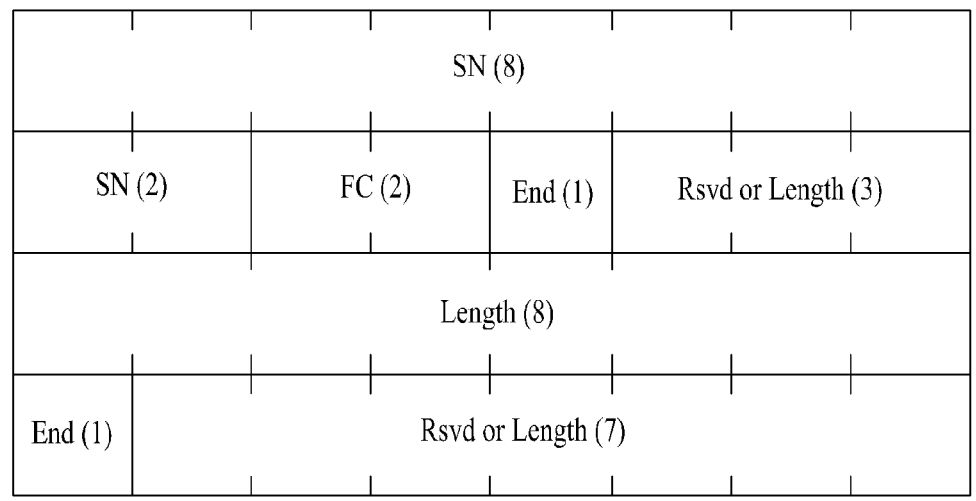
FIG. 7 is a diagram showing the format of a Fragmentation and Packing Extended Header (FPEH) of a wireless communication system.

FIG. 7 is a diagram showing the format of a Fragmentation and Packing Extended Header (FPEH) of a wireless communication system. The FPEH is used when the MAC PDU includes a payload for one transmission connection, and is located in front of the payload, that is, is located next to the last extended header if the MAC PDU includes the extended header and is located next to the generic MAC header if the MAC PDU does not include the extended header.

Automatic Repeat reQuest (ARQ)-enabled data uses a Sequence Number (SN) in order to perform retransmission of failed data. Currently, since the SN is transmitted through the FPEH in a wideband communication system such as an IEEE 802.16m system, in the case of ARQ-enabled data, even when fragmentation or packing does not occur, the FPEH may always be transmitted in order to normally perform an ARQ operation.

As shown in FIG. 7, the FPEH includes an SN field, an FC field, an End field, a length field, and the like. The SN field indicates the SN of the payload, and the FC field indicates whether or not the MAC PDU includes a Service Data Unit (SDU) fragment.

Next, an ARQ feedback polling request method according to an embodiment of the present invention will be described.

Figure 8:
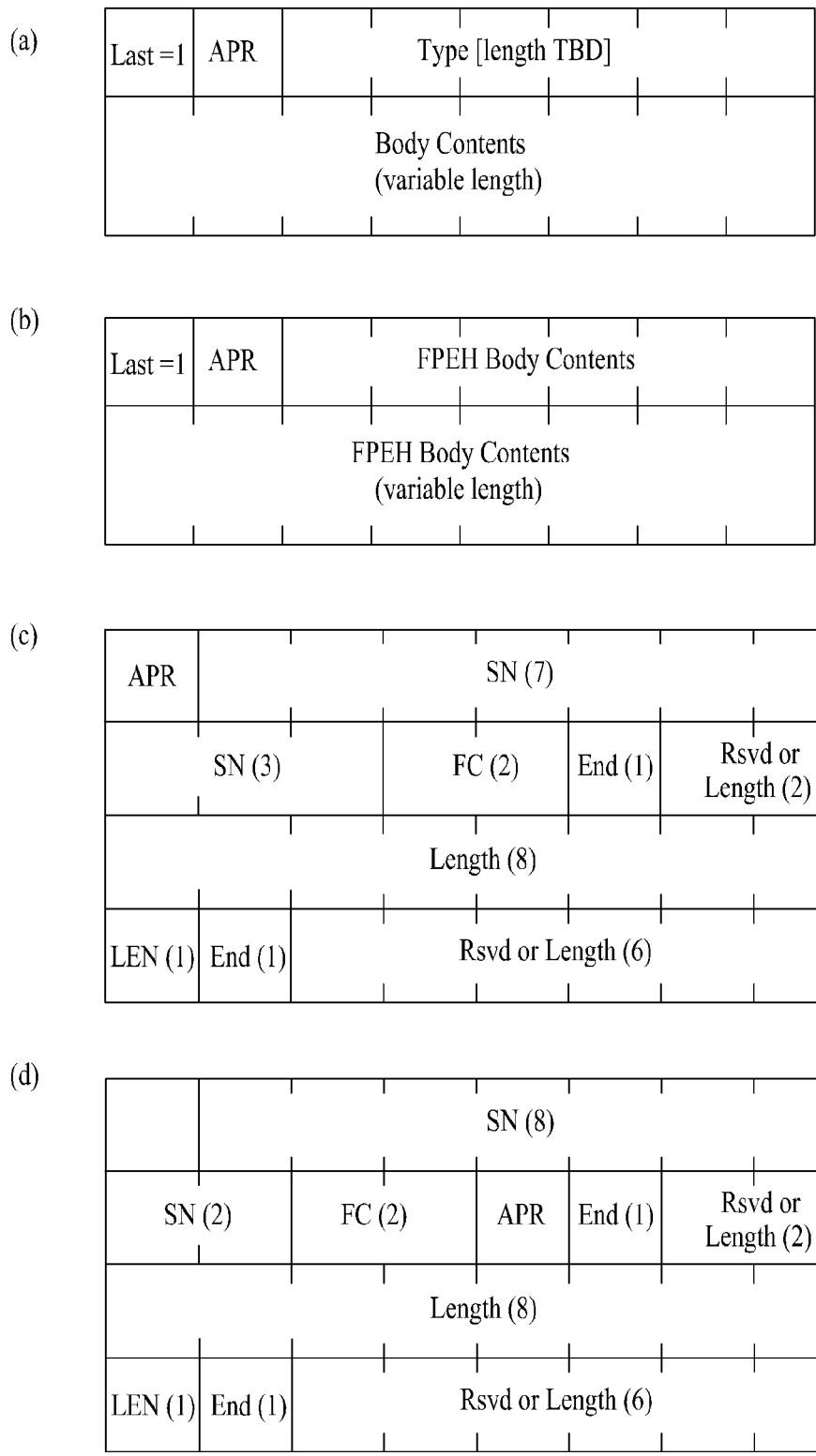
FIGS. 8(a) and 8(b) are diagrams showing a last extended header, to which an ARQ feedback Polling Request (APR) field is added, according to an embodiment of the present invention
FIGS. 8(c) and 8(d) are diagrams showing an FPEH, to which an ARP field is added, according to an embodiment of the present invention.

In a first ARQ feedback polling request method suggested by the embodiment of the present invention, an ARQ feedback Polling Request (APR) field indicating whether or not a transmitter makes a request for ARQ feedback polling is added to the last extended header or the FPEH. FIGS. 8(*a*) and 8(*b*) are diagrams showing the last extended header, to which the APR field is added, according to an embodiment of the present invention, and FIGS. 8(*c*) and 8(*d*) are diagrams showing the FPEH, to which the ARP field is added, according to an embodiment of the present invention.

The transmitter sets the APR field to "1" so as to request ARQ feedback transmission to the receiver. The receiver transmits an ARQ feedback if the APR field is set to "1" and transmits the ARQ feedback only when an ARQ feedback specific trigger condition is satisfied if the APR field is set to "0". The ARQ feedback specific trigger condition may indicate that the receiver does not receive an ARQ block in a predetermined period.

The transmitter may set the APR field to periodically or when a specific event occurs.

Figure 9:
FIG. 9 is a diagram showing an ARQ feedback polling extended header according to an embodiment of the present invention.
Figure 9:
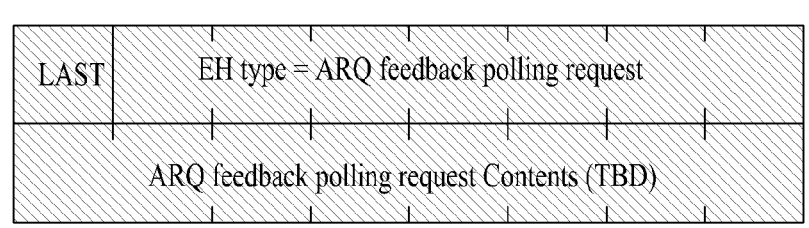

In a second ARQ feedback polling request method suggested by the embodiment of the present invention, an ARQ feedback polling request extended header is newly defined. FIG. 9 is a diagram showing the ARQ feedback polling extended header according to an embodiment of the present invention.

The ARQ feedback polling request extended header may include only a Type field without contents as shown in FIG. 9(*a*), or may include additional contents if necessary as shown in FIG. 9(*b*).

In the case where the transmitter requests the ARQ feedback to the receiver, the ARQ feedback polling request extended header is added to the MAC PDU and then the MAC PDU is transmitted. The receiver which receives the MAC PDU including the ARQ feedback polling request extended header may transmit the ARQ feedback to the transmitter.

Next, an ARQ feedback transmission indication method according to an embodiment of the present invention will be described.

According to a first ARQ feedback transmission indication method suggested by the embodiment of the present invention, an ARQ Feedback IE Indication (AFI) field indicating whether or not the ARQ feedback is transmitted is added to the last extended header, ARQ feedback Polling Extended Header (APEH) or the FPEH.

Figure 10:
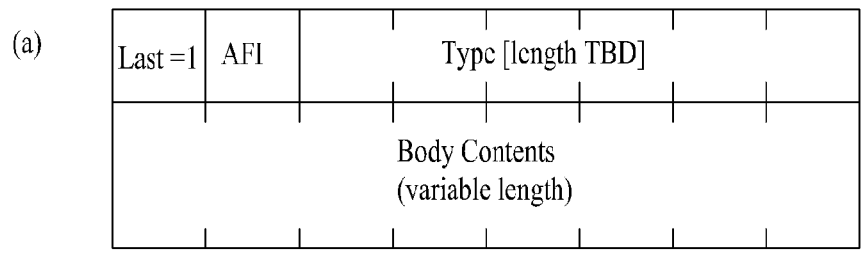
FIG. 10 is a diagram showing a last extended header or FPEH, to which an ARQ Feedback IE Indication (AFI) field is added, according to an embodiment of the present invention.
Figure 10:
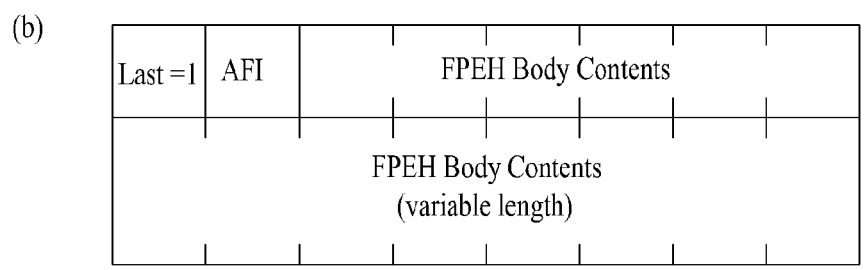
Figure 10:
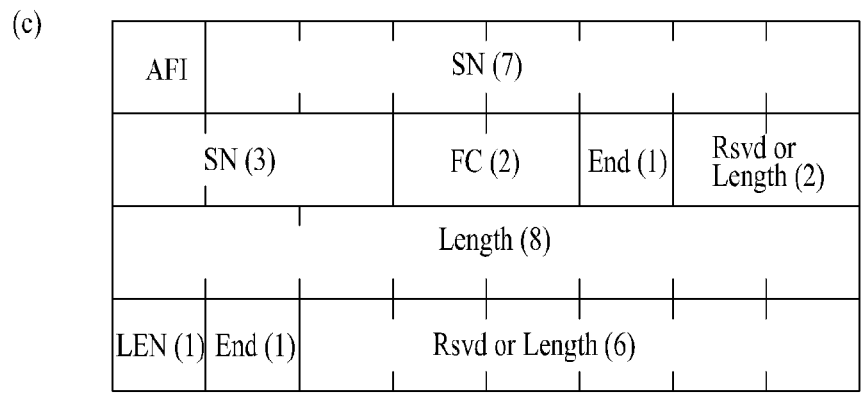
Figure 10:
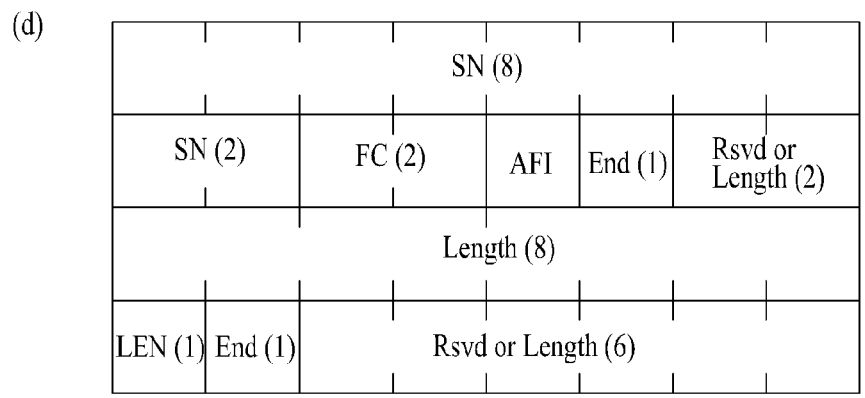

FIG. 10 is a diagram showing the last extended header or FPEH, to which the AFI field is added, according to an embodiment of the present invention.

FIG. 10(a) shows the last extended header to which the AFI field is added. Since the AFI should be transmitted through the extended header and needs to be transmitted with respect to one MAC PDU only once, if the payload including one or more ARQ feedback IEs is present in the MAC PDU and the Last field of the extended header is set to 1, the AFI field is defined next to the Last field.

FIGS. 10(b) to 10(d) show the FPEH to which the AFI field is added.

If the AFI field is set to "1", this indicates that a receiver transmits the MAC PDU includes the ARQ feedback.

Figure 11:
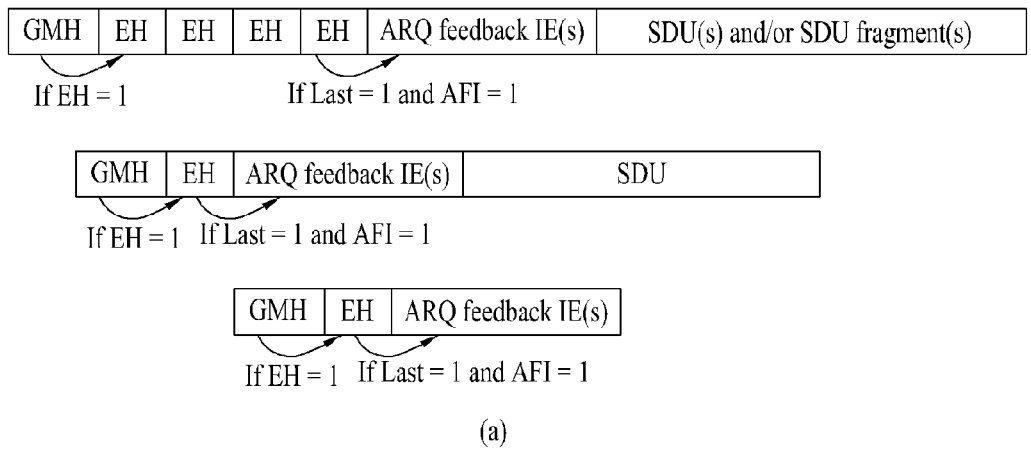
FIG. 11 is a diagram showing a MAC PDU including an extended header, to which an AFI field is added, according to an embodiment of the present invention.
Figure 11:
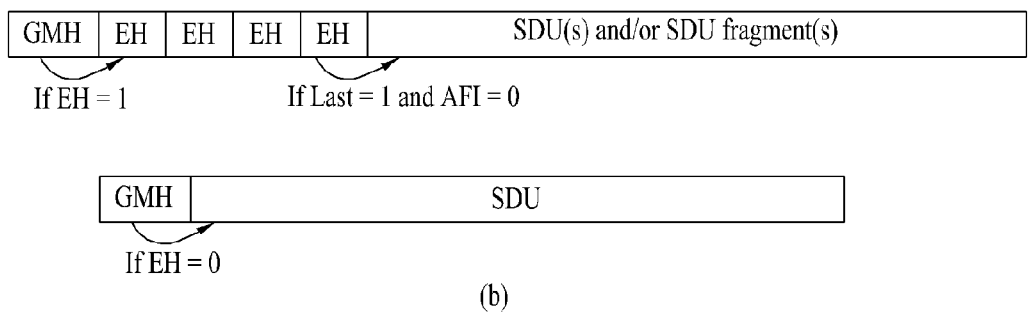
Figure 11:
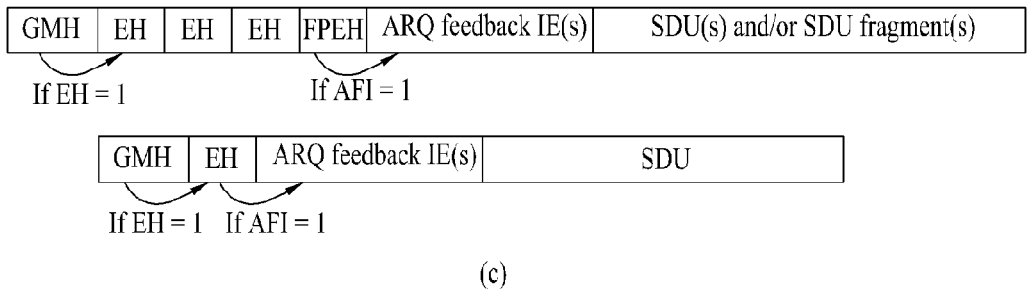

FIG. 11 is a diagram showing a MAC PDU including the extended header, to which the AFI field is added, according to an embodiment of the present invention.

FIG. 11(a) shows the case where the ARQ feedback IE is transmitted. As shown in FIG. 11(a), the Last field and the AFI field of the last extended header are set to "1" and the MAC PDU includes the ARQ feedback IE.

FIG. 11(b) shows the case where the ARQ feedback IE is not transmitted. As shown in FIG. 11(b), the Last field of the last extended header is set to "1", the AFI field is set to "0", and the MAC PDU does not include the ARQ feedback IE.

If the MAC PDU does not require any extended header and is transmitted without the ARQ feedback IE, the MAC PDU may be transmitted without postfixing any extended header to the generic MAC header. However, if the MAC PDU does not require any extended header but includes the ARQ feedback IE, the MAC PDU may include one extended header including the AFI field and the Last field set to "1". At this time, if the Type field follows the AFI field, this has an insignificant value.

FIG. 11(c) shows the case where the FPEH is transmitted. As shown in FIG. 11(c), the AFI field of the FPEH is set to "1" and the MAC PDU includes the ARQ feedback IE.

Figure 12:
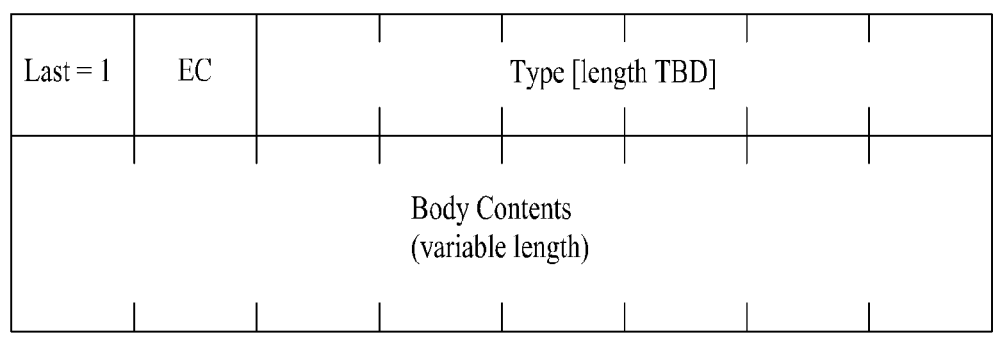
FIG. 12 is a diagram showing the case where an EC field for controlling data encryption is included in an extended header.
Figure 12:
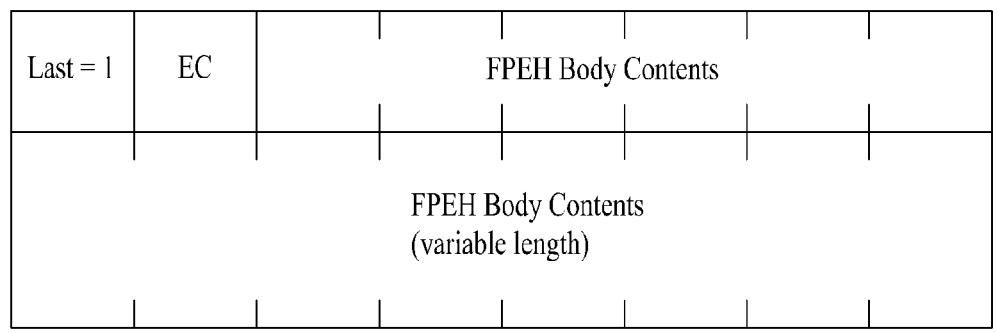

In the first ARQ feedback transmission indication method suggested by the embodiment of the present invention, specific contents are not required but may be used to define fields which need to be additionally indicated. FIG. 12 is a diagram showing the case where an EC field for controlling data encryption is included in the extended header. As shown in FIG. 12, the EC field for controlling the data encryption may be included in the last extended header.

Figure 13:
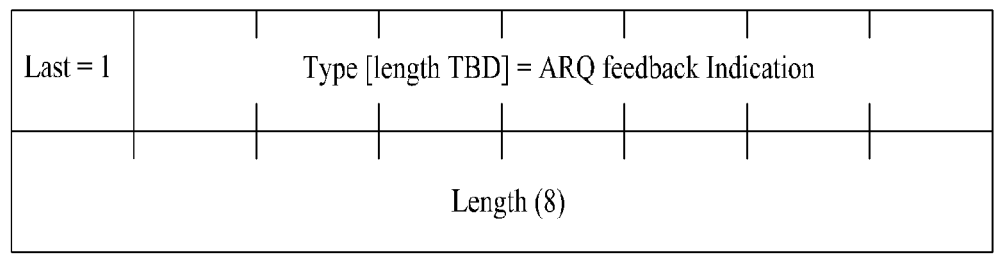
FIG. 13 is a diagram showing an ARQ feedback indication extended header according to an embodiment of the present invention.
Figure 13:
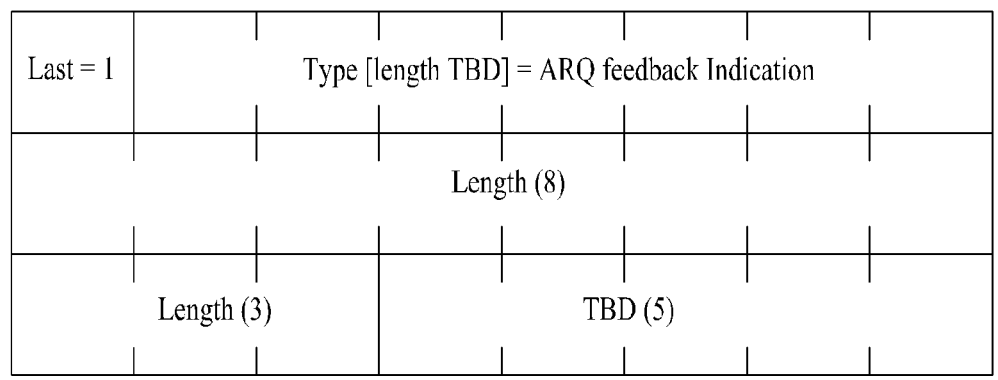

In a second ARQ feedback transmission indication method suggested by the embodiment of the present invention, the ARQ feedback indication extended header is newly defined. FIG. 13 is a diagram showing an ARQ feedback indication extended header according to an embodiment of the present invention.

The ARQ feedback indication extended header may be defined as one type of extended header. In the related art, if the ARQ feedback IE is packed with another SDU or SDU fragment, a PSH is used to distinguish between the ARQ feedback IE payload and the SDU or the SDU fragment. However, since the PSH includes unnecessary information about the ARQ feedback IE, overhead is increased. In the embodiment of the present invention, in order to minimize overhead and indicate whether or not the ARQ feedback IE is transmitted, the ARQ feedback indication extended header having only the length of the ARQ feedback IE payload as contents is defined.

As shown in FIG. 13, the ARQ feedback indication extended header includes a Last field, a Type field and a Length field. The Length field indicates the length of the ARQ feedback IE.

Figure 14:
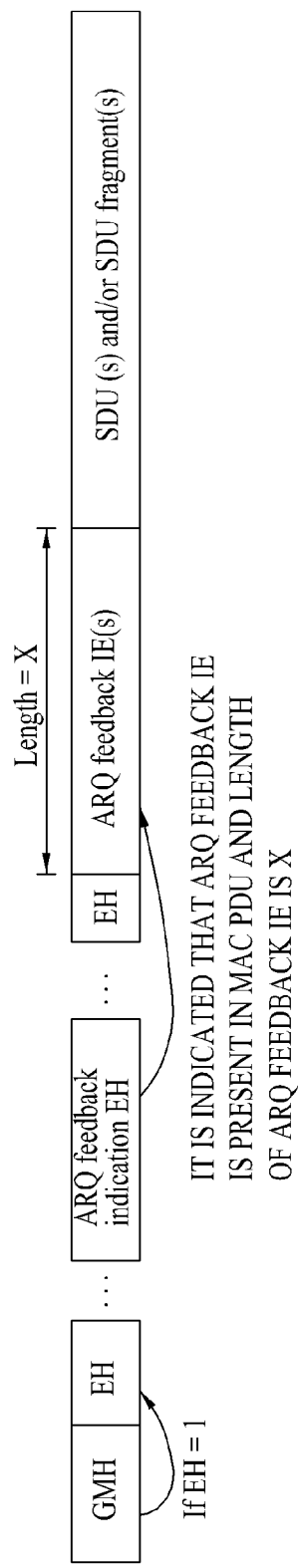
FIG. 14 is a diagram showing a MAC PDU including an ARQ feedback indication extended header according to an embodiment of the present invention.

FIG. 14 is a diagram showing a MAC PDU including an ARQ feedback indication extended header according to an embodiment of the present invention.

As shown in FIG. 14, the ARQ feedback indication extended header indicates that the MAC PDU includes the ARQ feedback IE, and the length of the ARQ feedback IE.

Next, an ARQ feedback polling request and transmission indication method according to an embodiment of the present invention will be described.

According to the embodiment of the present invention, if the transmitter transmits the ARQ feedback information to the receiver while requesting ARQ polling, one MAC PDU may include both the AFI field and the APR field.

FIG. 15 is a diagram showing a FPEH including an AFI field and an APR field according to an embodiment of the present invention.

As shown in FIG. 15, the FPEH according to the embodiment of the present invention includes an SN field, an FC field, an AFI field, an APR field, an End field, and the like.

The AFI field indicates whether or not the MAC PDU includes the ARQ feedback IE and the APR field indicates whether or not the transmitter requests the ARQ feedback to the receiver.

Next, the ARQ feedback polling request and transmission indication method according to the embodiment of the present invention in the case where a Multiplexing Extended Header (MEH) is used will be described.

The MEH is used when the MAC PDU includes an SDU or an SDU fragment of another connection.

FIG. 16 is a diagram showing an MEH according to an embodiment of the present invention. As shown in FIG. 16, the MEH includes a Last field, a Type field, an AFI field and a Multiplexing Extended Header Block (MEHB) field. The AFI field indicates whether or not the MAC PDU includes the ARQ feedback IE.

FIG. 17 is a diagram showing an MEHB according to an embodiment of the present invention.

The Multiplexing Extended Header block (MEHB) includes information about an SDU or an SDU fragment included in the same connection.

As shown in FIG. 17, the MEHB may include an M field, a Flow ID field, an FC field, an SN field, an APR field, a Last field and a Length field.

The M field indicates whether or not another MEHB is located next to the MEHB, that is, whether the MEHB is a last MEHB.

The APR field indicates whether or not the transmitter requests the ARQ feedback to the receiver for a corresponding connection, and is set to "1" if the transmitter requests the ARQ feedback to the receiver for the corresponding connection.

The Last field indicates whether or not another Length field is present and the Length field indicates the length of each of SDUs, information about which is included in the MEHB.

Next, a method of transmitting, at the transmitter, extended header including the ARQ feedback IE in a portion of the extended header will be described.

Table 1 shows the format of the FPEH including the ARQ feedback IE according to the embodiment of the present invention. As shown in Table 1, if the AFI is "1", the ARQ feedback IE may be included in the FPEH.

TABLE 1

| Syntax | Size (bit) | Notes |
|---|---|---|
| FPEH( ) { | | |
| RI | 1 | Re-arrangement header Indicator Always set to '0' |
| SN | 10 | |
| FC | 2 | |
| AFI | 1 | |
| AFP | 1 | |
| Do { | | |
| End | 1 | |
| If (End==0) { | | |
| Length | 11 | Length of SDU or SDU fragment |
| } | | |
| } while (!End) | | |
| IF (AFI==1) { | | |
| ARQ Feedback IE | variable | |
| } | | |
| reserved | variable | |
| } | | |

In Table 1, RI indicates whether or not the PDU includes ARQ retransmission information. That is, if RI is "0", this indicates that the ARQ block is initially transmitted or is transmitted without rearrangement and then the FPEH format follows, and, if RI is "1", this indicates that the ARQ block is rearranged and transmitted and the format of a Rearrangement Fragmentation and Packing Extended Subheader RFPEH) follows.

Table 2 shows the format of the RFPEH including the ARQ feedback IE according to the embodiment of the present invention.

TABLE 2

| Syntax | Size (bit) | Notes |
|---|---|---|
| RFPEH( ) { | | |
| RI | 1 | re-arrangement header Indicator Always set to '1' |
| SN | 10 | ARQ block sequence number |
| FC | 2 | Fragmentation control (see Table 9) |
| AFI | 1 | ARQ feedback IE indicator |
| AFP | 1 | ARQ Feedback poll indicator |
| LSI | | Last ARQ sub-block indicator |
| SSN | | SUB-SN of the first ARQ sub-block |
| Do { | | |
| End | 1 | |
| If (End==0) { | | |
| Length | 11 | Length of SDU or SDU fragment |
| } | | |
| } while (!End) | | |
| IF (AFI==1) { | | |
| ARQ Feedback IE | variable | |
| } | | |
| reserved | variable | |
| } | | |

In Table 2, LSI indicates a last ARQ sub-block indicator. If LSI is "0", this indicates that the last ARQ sub-block of one ARQ block is not included in the PDU and, if LSI is "1", this indicates that the last ARQ sub-block of one ARQ block is included in the PDU. In addition, SSN indicates the sub-sequence number of a first ARQ sub-block.

Table 3 shows the format of the MEH including the ARQ feedback IE according to the embodiment of the present invention. As shown in Table 3, if AFI is "1", the ARQ feedback IE may be included in the FPEH.

TABLE 3

| Syntax | Size (bit) | Notes |
|---|---|---|
| MEH( ) { | | |
| LAST | 1 | 0 = Another extended header follows MEH<br>1 = another extended header does not follow MEH |
| Type | TBD | MEH type |
| AFI | 1 | ARQ feedback IE indication |
| Do { | | |
| MEHB (M) | 1 | Multiplexing extended header block |
| } while (!M) | | |
| IF (AFI==1) { | | |
| ARQ Feedback IE | variable | |
| } | | |
| reserved | variable | |
| } | | |

Hereinafter, the ARQ feedback message format will be described.

First, an ARQ feedback message of an IEEE 802.16e system may be reused as an ARQ feedback message format.

Second, an optimized ARQ feedback message may be newly defined. In this case, signaling overhead can be reduced as compared with the ARQ feedback message of the IEEE 802.16e system.

Third, a new extended header format for the ARQ feedback message may be defined and transmitted in a state of being attached to the header of the MAC PDU.

Fourth, a new header of the MAC PDU for the ARQ feedback message may be defined and the new header is independently transmitted.

First, the case where the ARQ feedback message of the IEEE 802.16e system is reused as the ARQ feedback message format will be described. In the IEEE 802.16e system, a data block is an ARQ block logically segmented from the MAC SDU according to a predetermined size. The SNs of the ARQ blocks are sequentially determined. The ARQ feedback message is transmitted in a state of being included in the payload of the MAC PDU. Information indicating whether or not the ARQ feedback message is transmitted may be indicated by the Type field of the header. An ARQ feedback message with a relatively small size may be frequently packed with other MAC SDUs. In this case, the ARQ feedback message may be located at a foremost location of the other MAC SDUs. If the ARQ feedback message is packed with the MAC SDUs, a PSH is located in front of the ARQ feedback message. The Length field of the PSH indicates the total length of the PSH and all the ARQ feedback messages.

However, the ARQ feedback messages are transmitted in a state of being included in the payload, but it is not required ACK/NACK or reordering for the ARQ feedback messages. Accordingly, the SN field and the FC field of the PSH may cause unnecessary overhead. Therefore, there is a need for an ARQ feedback message format which is capable of reducing overhead. In the IEEE 802.16e system, one SN is allocated to each ARQ block and transmission/retransmission is performed in the ARQ block units. In contrast, in an IEEE 802.16m or 3GPP LTE system, one SN may be allocated to each MAC PDU and transmission/retransmission may be performed in the MAC PDU units. That is, the data block which is a data unit for performing ARQ is a MAC PDU. If the data block is the MAC PDU and one SN is allocated to each MAC PDU, a rearrangement problem may occur in the retransmission of the MAC PDU. Accordingly, an ARQ feedback message format capable of supporting rearrangement during the MAC PDU retransmission needs to be newly defined.

Next, the method of defining the new extended header format for the ARQ feedback message and transmitting the new extended header format in a state of being attached to the header of the MAC PDU will be described. That is, the ARQ feedback extended header is newly defined and used as the ARQ feedback message. The presence of the extended header is indicated by the EH field of the header of the MAC PDU. The ARQ feedback extended header may be transmitted per flow. Since the ARQ feedback message is used to indicate ACK/NACK for data transmitted per flow (or connection), the ARQ feedback message may also be transmitted per flow (or connection).

Figure 18:
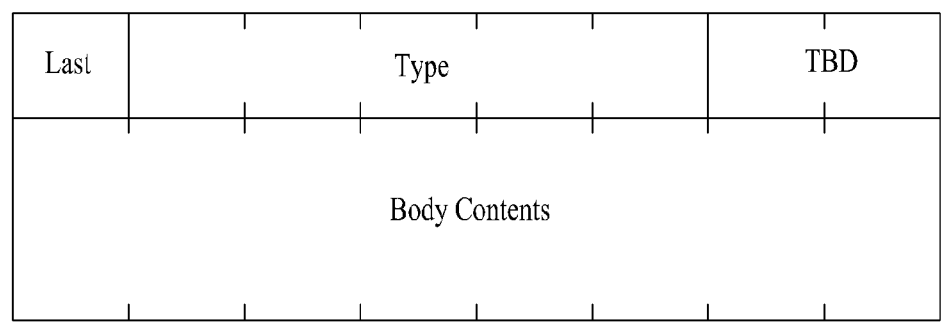
FIG. 18 is a diagram showing an example of an extended header format.

FIG. 18 is a diagram showing an example of an extended header format.

Referring to FIG. 18, the extended header includes a Last field, a Type field and a Body Contents field. The Last field indicates whether or not an additional extended header is postfixed to the extended header. The size of the Last field may be 1 bit. The Type field indicates the type of the extended header. The size of the Type field is "to be determined (TBD)". The Body Contents field includes contents defined according to types. The size of the Body Contents field may be varied according to types. If the Type field of the extended header indicates the ARQ feedback, the extended header becomes the ARQ feedback extended header used as the ARQ feedback message.

Hereinafter, an extended header format indicating the ARQ feedback in a bitmap format will be described.

Figure 19:
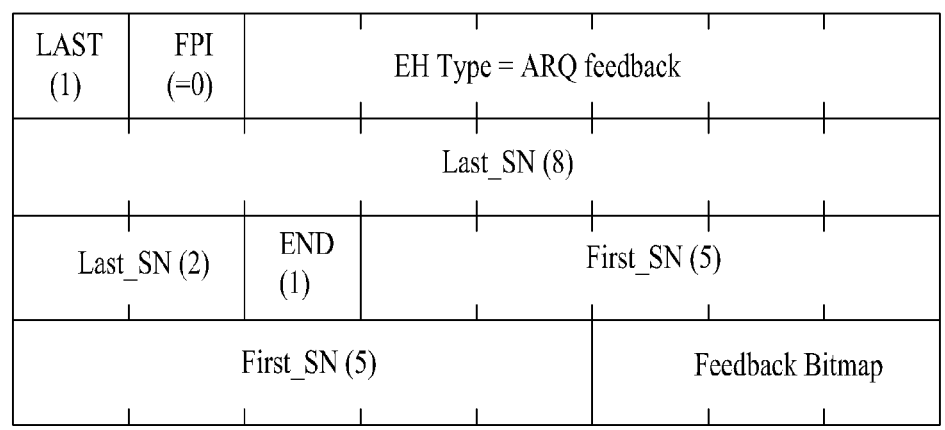
FIG. 19 is a diagram showing an example of an ARQ feedback extended header format.
Figures 20, 21:
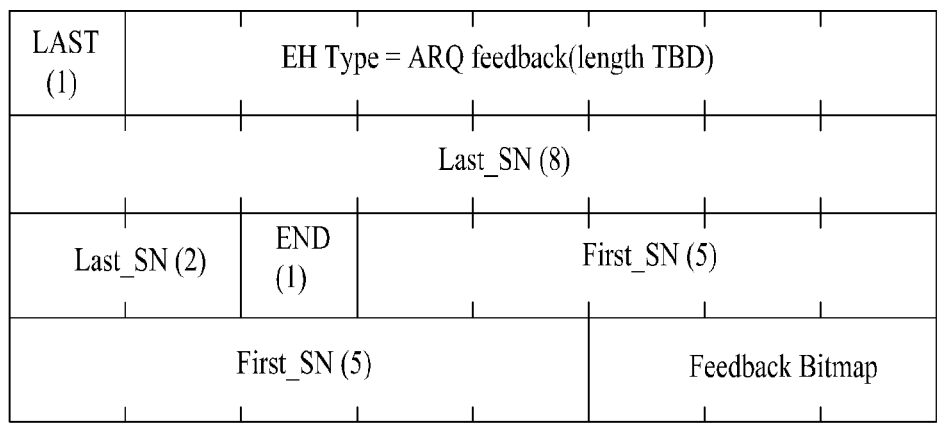
FIG. 20 is a diagram showing another example of the ARQ feedback extended header format.
FIG. 21 is a first example of an ACK bitmap.

FIG. 19 is a diagram showing an example of an ARQ feedback extended header format. FIG. 20 is a diagram showing another example of the ARQ feedback extended header format. An FPI is included in FIG. 19 and an FPI is not included in FIG. 20.

Referring to FIGS. 19 and 20, the Body Contents field includes a Last_SN, an END, a First_SN and an ACK/NACK bitmap. The length of the SN is 10 bits, but may be varied according to systems. The size of the Body Contents field may be 3 bytes or more.

The Last_SN indicates a last SN value of the ACK/NACK bitmap. The size of Last_SN may be 10 bits. The last SN is a highest SN value of the MAC PDU in which ACK/NACK feedback is possible when the receiver satisfies an ARQ feedback trigger condition.

The END indicates whether First_SN is located next to the END. The size of END may be 1 bit. If the receiver successfully receives all the MAC PDUs up to the last SN, the END value is 0. The transmitter may receive the ARQ feedback extended header with a total of 3 bytes. If the receiver should feed back one or more NACKs, the END value is 1 and First_SN follows END.

The First_SN indicates a first SN value of the ACK/NACK bitmap. The size of First_SN may be 10 bits. The first SN may be a lowest SN of the MAC PDUs with the NACK determined by the receiver or may be a value obtained by adding 1 to an SN which is lastly fed back by the receiver.

The ACK/NACK bitmap indicates ACK/NACK from First_SN to Last_SN in the bitmap format. The ACK/NACK bitmap may be byte-aligned.

Figure 22:
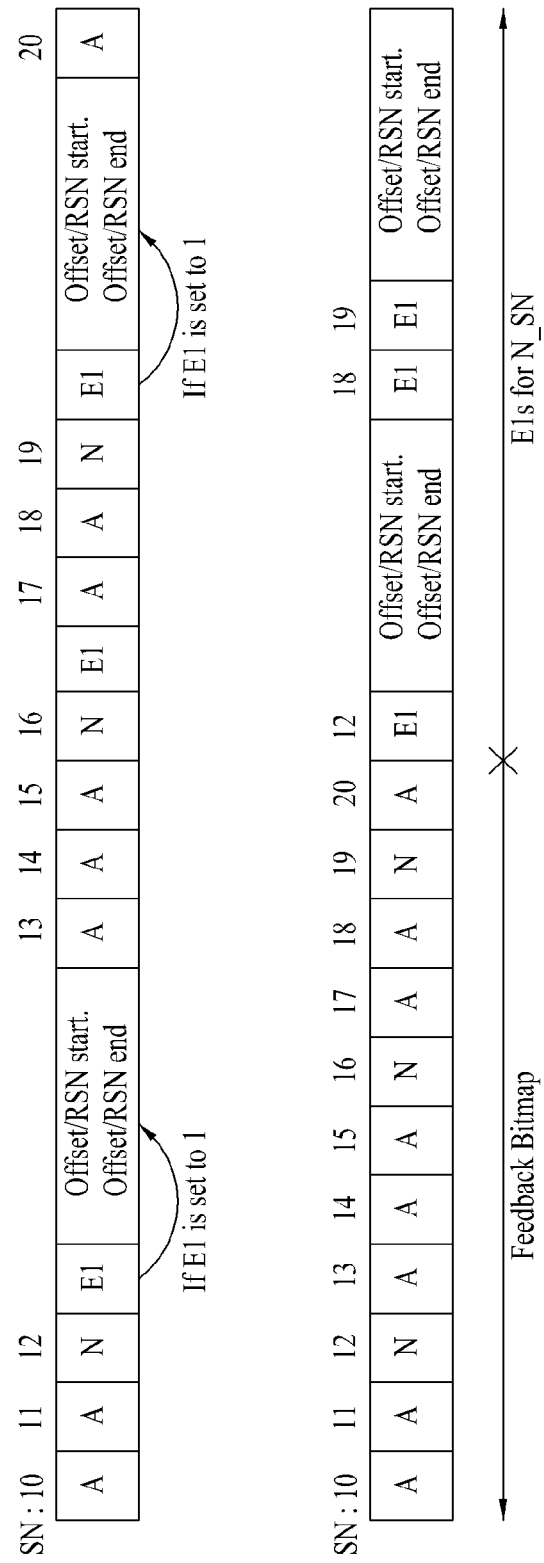
FIG. 22 is a second example of the ACK bitmap.
Figure 23:
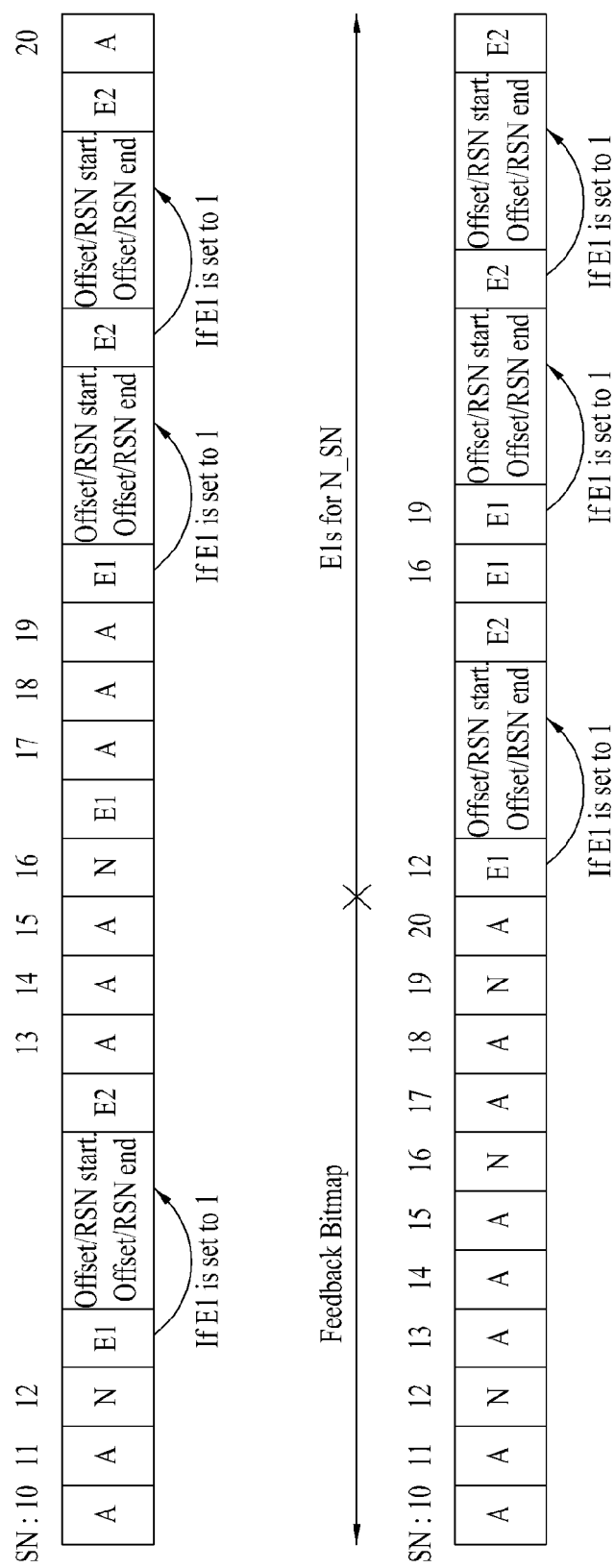
FIG. 23 is a third example of the ACK bitmap.

FIG. 21 is a first example of the ACK bitmap. FIG. 22 is a second example of the ACK bitmap. FIG. 23 is a third example of the ACK bitmap. FIGS. 21 to 23 show the examples of the case where First_SN is 10, Last_SN is 20, and the receiver does not successfully receive the MAC PDUs having SNs of 12, 16 and 19.

Referring to FIG. 21, the ACK/NACK bitmap sequentially indicates the ACK/NACKs for SNs. The ACK/NACK feedback is allocated 1 bit per SN. Each bit of the ACK/NACK bitmap represents the ACK/NACK of corresponding SN. For example, an ACK may be represented by 1 and a NACK may be represented by 0.

However, the SNs having the NACK may be the feedback for the retransmitted MAC PDUs. The retransmitted MAC PDUs may be rearranged. The MAC PDUs which are rearranged and then transmitted may be portions of initial MAC PDUs. The receiver may request retransmission with respect to a MAC PDU, which is not received, of a MAC PDU belonging to one SN.

Referring to FIG. 22, E1 is always added to the feedback of the SN having the NACK. E1 may be located next to the NACK. Alternatively, E1 may be separately located in back of the ACK/NACK bitmap.

E1 indicates whether or not an RSN set follows E1. The RSN set includes RSN_start and RSN_end. RSN_start indicates a first byte location of some of the rearranged MAC PDUs in the initial MAC PDUs. RSN_end indicates a last byte location of some of the rearranged MAC PDUs in the initial MAC PDUs.

However, some of the MAC PDUs which are rearranged and transmitted may be required the feedback for a plurality of discontinuous portions. Referring to FIG. 23, E2 is added to E1 and the RSN set which is additionally transmitted.

Figure 24:
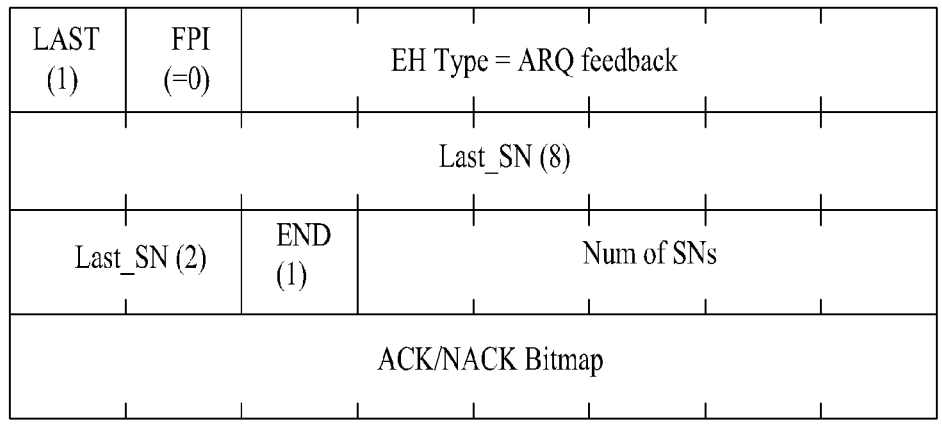
FIGS. 24 and 25 are diagrams showing the other examples of the ARQ feedback extended header format.
Figure 25:
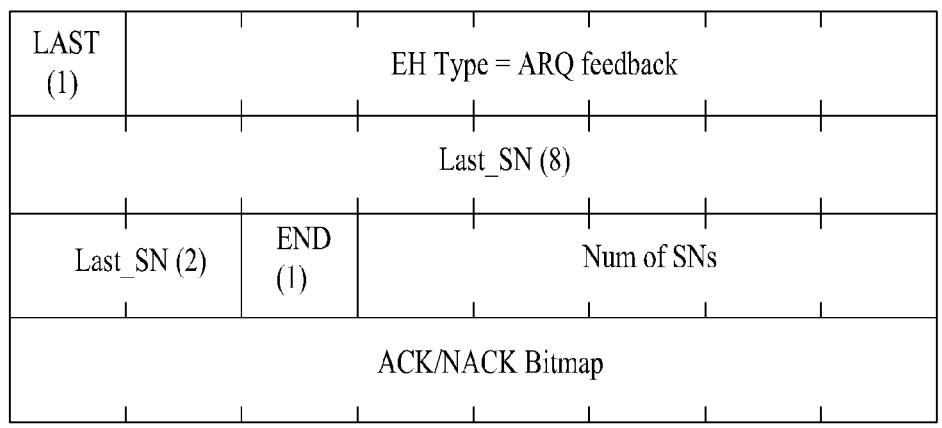

FIGS. 24 and 25 are diagrams showing the other examples of the ARQ feedback extended header format. An FPI is included in FIG. 24 and an FPI is not included in FIG. 25.

Referring to FIGS. 24 and 25, the Body Contents field includes a Last_SN, an END, the number of SNs, and an ACK/NACK bitmap.

The END indicates whether or not the number of SNs is located next to the END. If the receiver successfully receives all the MAC PDUs up to the last SN, the END value is 0. The transmitter may receive the ARQ feedback extended header having a total of 3 bytes. If the receiver should feed back one or more NACKs, the END value is 1 and the number of SNs follows END.

The number of SNs indicates the size of the ACK/NACK bitmap. The number of SNs may be "Last_SN—lowest SN of the MAC PDUs with the NACK determined by the receiver" or "Last_SN—lastly fed-back SN+1". For the other portion, reference may be made to the above description.

Figure 26:
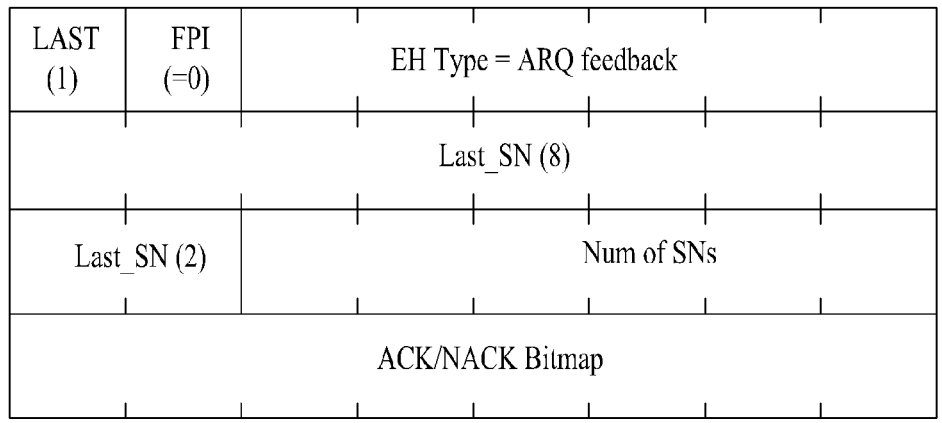
FIGS. 26 and 27 are diagrams showing the other examples of the ARQ feedback extended header format.
Figure 27:
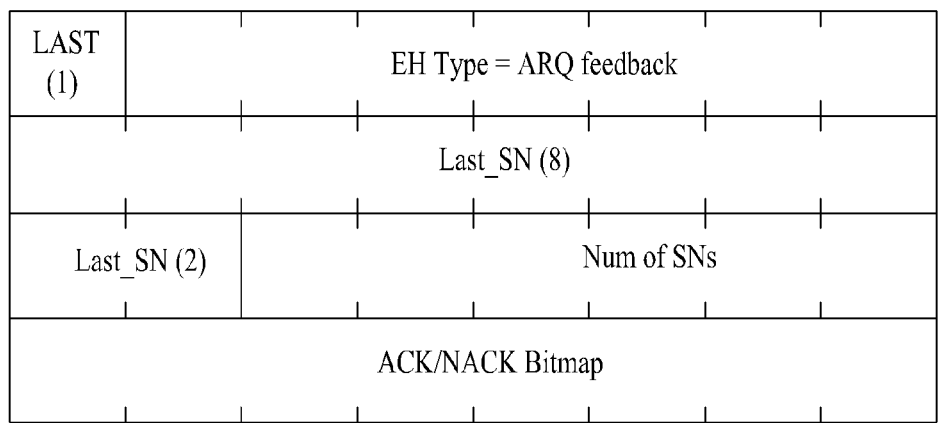

FIGS. 26 and 27 are diagrams showing the other examples of the ARQ feedback extended header format. An FPI is included in FIG. 26 and an FPI is not included in FIG. 27.

Referring to FIGS. 26 and 27, the Body Contents field includes a Last_SN, the number of SNs, and an ACK/NACK bitmap. If the number of SNs is 0, the ACK/ACK bitmap does not follow the number of SNs.

Next, an ARQ feedback extended header for transmitting a selective NACK will be described. The following ARQ feedback extended header for the selective NACK may become an ARQ feedback extended header for transmitting a selective ACK using the ACK instead of the NACK.

FIGS. 28 and 29 are diagrams showing the other examples of the ARQ feedback extended header format. An FPI is included in FIG. 28 and an FPI is not included in FIG. 29.

Referring to FIGS. 28 and 29, the Body Contents field includes a cumulative SN, the number of NACKs, and a selective NACK.

The cumulative SN indicates the SN value of a last MAC PDU out of the MAC PDUs, the reception of which is successful by the receiver. If the receiver successfully receives all the MAC PDUs when the ARQ feedback extended header is generated, the NACK is absent. The value of the number of NACKs is 0 and the ARQ feedback extended header may have a length of 3 bytes.

The number of NACKs indicates the number of selective NACKs. If the number of NACKs is 0, this indicates that the selective NACK is not located next to the number of NACKs.

Figure 32:
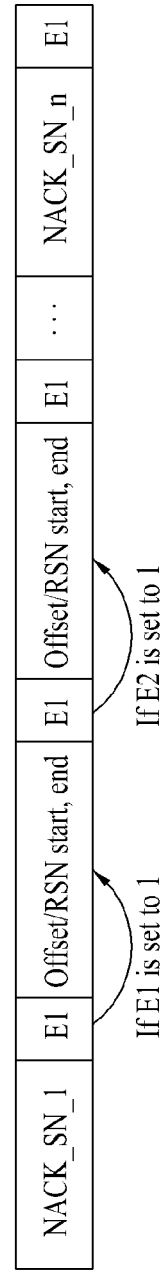
FIG. 32 is a diagram showing a second example of the selective NACK.

FIG. 30 is a diagram showing a first example of a selective NACK. FIG. 31 is a diagram showing a second example of the selective NACK. FIG. 32 is a diagram showing a third example of the selective NACK.

Referring to FIG. 30, the selective NACKs are sequentially fed back by the number of NACKs in order of the SNs of the MAC PDUs which are determined not to be received by the receiver. Here, n denotes the number of NACKs.

Referring to FIG. 31, if the rearranged MAC PDUs are not successfully received, E1 is used for partial feedback of the NACK SN. If the E1 value is 1, the RSN set is added and transmitted for partial feedback. The RSN set includes RSN_start and RSN_end. If the E1 value is 0, a next NACK SN follows E1.

However, if the MAC PDUs belonging to NACK SN are rearranged as a plurality of MAC PDUs and are transmitted, the feedback for a plurality of discontinuous portions of the MAC PDUs may be necessary. Referring to FIG. 32, E2 follows E1 and the RSN set, the E2 is additionally transmitted.

The ARQ feedback extended header for transmitting the cumulative and selective NACK using the number of NACK SNs can be generated.

Next, the ARQ feedback extended header using an extended bit will be described. The following ARQ feedback extended header for the selective NACK may become the ARQ feedback extended header for transmitting a selective ACK using the ACK instead of the NACK.

FIGS. 33 and 34 are diagrams showing the other examples of the ARQ feedback extended header format. A FPI is included in FIG. 33 and a FPI is not included in FIG. 34.

Referring to FIGS. 33 and 34, the Body Contents field includes a cumulative SN, an END and a selective NACK. If the receiver successfully receives all MAC PDUs up to the cumulative SN, the NACK is absent. The END value is 1. If the END value is 1, the selective NACK does not follow the END. If the END value is 0, a first NACK SN follows the END.

Figure 35:
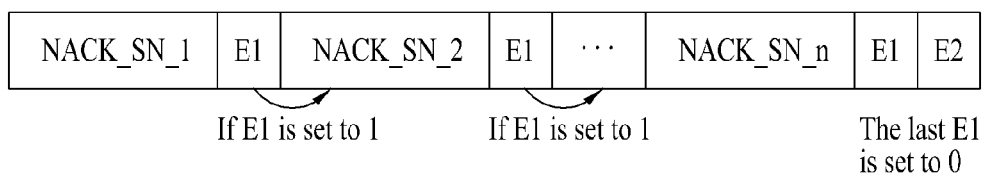
FIG. 35 is a diagram showing a first example of a selective NACK using an extended bit.
Figure 36:
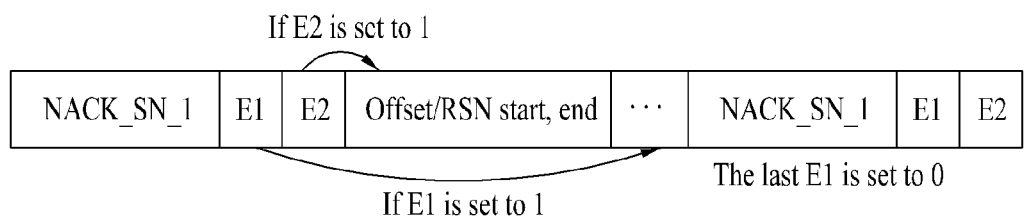
FIG. 36 is a diagram showing a second example of the selective NACK using the extended bit.
Figure 37:
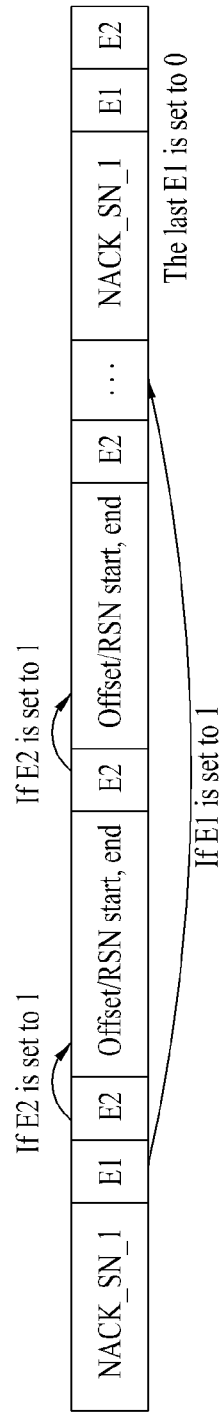
FIG. 37 is a diagram showing a third example of the selective NACK using the extended bit.

FIG. 35 is a diagram showing a first example of a selective NACK using an extended bit. FIG. 36 is a diagram showing a second example of the selective NACK using the extended bit. FIG. 37 is a diagram showing a third example of the selective NACK using the extended bit.

Referring to FIG. 35, the selective NACKs and the E1 bits are sequentially fed back in order of the SNs (NACK SNs) of the MAC PDUs which are determined not to be received by the receiver. The E1 bit indicates whether or not a next NACK SN is transmitted.

Referring to FIG. 36, if the rearranged MAC PDUs are not successfully received, the E2 bit is used for partial feedback of the NACK SN. If the E2 bit value is 1, the RSN set is added and transmitted for partial feedback. The RSN set includes RSN_start and RSN_end. If the E2 bit value is 0, the RSN set is not added. The NACK SN continues until the E1 bit value becomes 0.

However, if the MAC PDUs belonging to the NACK SN are rearranged as a plurality of MAC PDUs and are transmitted, the feedback of a plurality of discontinuous portions of the MAC PDUs may be necessary. Referring to FIG. 37, an E3 bit is added to the E1 bit, the E2 bit and the RSN set.

Hereinafter, the configurations of preferred embodiments of a transmitter apparatus and a receiver apparatus in a wireless communication system for implementing the above-described embodiments will be described.

Figure 38:
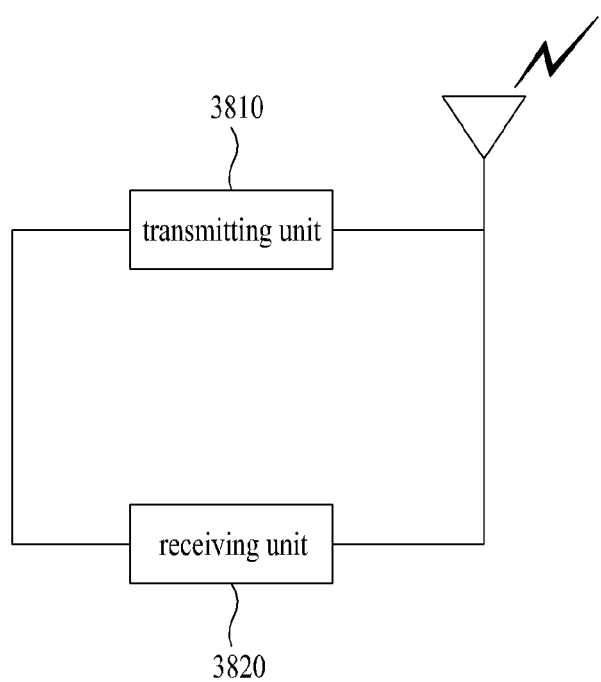
FIG. 38 is a diagram showing the configuration of a preferred embodiment of a transmitting apparatus for receiving ARQ feedback in a wireless communication system.

FIG. 38 is a diagram showing the configuration of a preferred embodiment of a transmitter apparatus for receiving an ARQ feedback in a wireless communication system.

Referring to FIG. 38, the transmitting apparatus includes a transmitting unit 3810 and a receiving unit 3820. The transmitting unit 3810 may transmit a PDU including an extended header including an ARQ Feedback Polling (AFP) field or a Type field indicating whether or not the transmitter makes a request for ARQ feedback polling to the receiver. If the AFP field or the Type field indicates that the transmitter makes a request for ARQ feedback polling to the receiver, the receiving unit 3820 may receive the ARQ feedback from the receiver.

Figure 39:
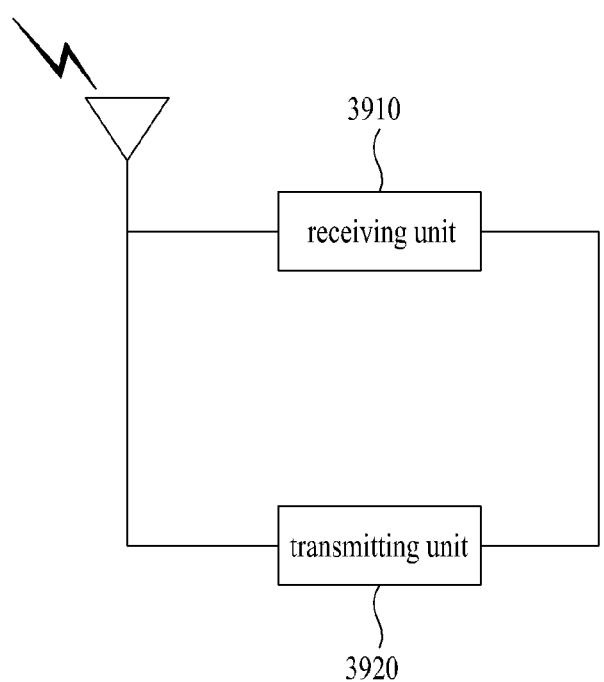
FIG. 39 is a diagram showing the configuration of a preferred embodiment of a receiver apparatus for transmitting ARQ feedback in a wireless communication system.

FIG. 39 is a diagram showing the configuration of a preferred embodiment of a receiver apparatus for transmitting an ARQ feedback in a wireless communication system.

Referring to FIG. 39, the receiver apparatus includes a receiving unit 3910 and a transmitting unit 3920. The receiving unit 3910 may receive a PDU including an extended header including an AFP field or a Type field indicating whether or not the transmitter makes a request for ARQ feedback polling from the transmitter. If the AFP field or the Type field indicates that the transmitter makes a request for ARQ feedback polling to the receiver, the transmitting unit 3920 may transmit the ARQ feedback to the transmitter.

Figure 40:
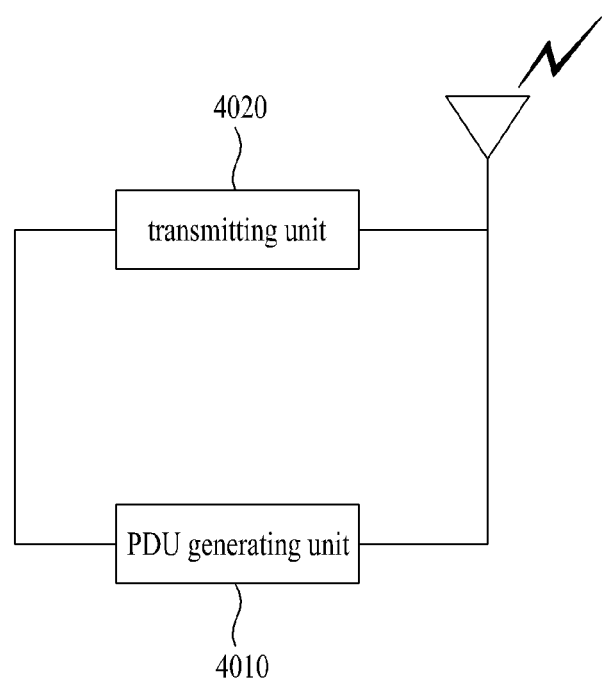
FIG. 40 is a diagram showing the configuration of a preferred embodiment of a transmitter apparatus for receiving ARQ feedback in a wireless communication system.

FIG. 40 is a diagram showing the configuration of a preferred embodiment of a transmitter apparatus for receiving an ARQ feedback in a wireless communication system.

Referring to FIG. 40, the transmitter apparatus includes a PDU generating unit 4010 and a transmitting unit 4020. The PDU generating unit 4010 may generate a PDU including a Multiplexing Extended Header (MEH) including an AFI field and Multiplexing Extended Header Blocks (MEHBs). The transmitting unit 4020 may transmit the PDU generated by the PDU generating unit 4010 to the receiver. At this time, the AFI field indicates whether or not the PDU includes an ARQ feedback IE, and the MEHBs may include SDUs or SDU fragments included in the same connection.

Figure 41:
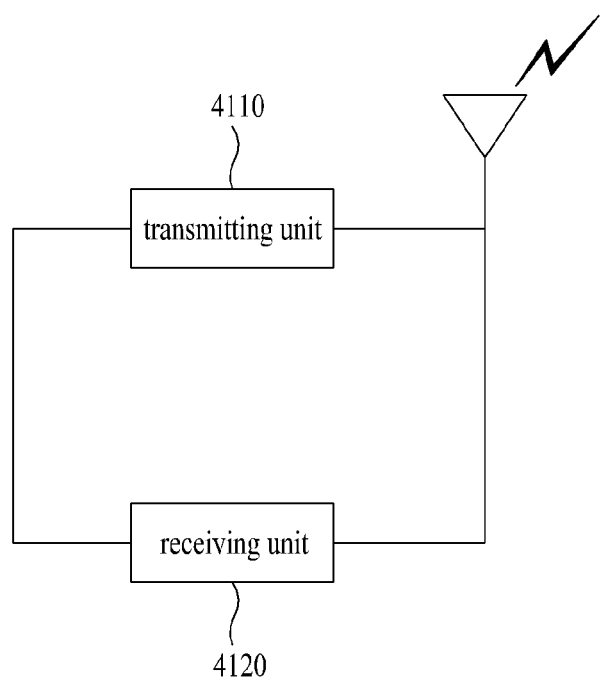
FIG. 41 is a diagram showing the configuration of a preferred embodiment of a transmitter apparatus for receiving ARQ feedback in a wireless communication system.

FIG. 41 is a diagram showing the configuration of a preferred embodiment of a transmitter apparatus for receiving an ARQ feedback in a wireless communication system.

Referring to FIG. 41, the transmitter apparatus includes a transmitting unit 4110 and a receiving unit 4120. The transmitting unit 4110 transmits a PDU including an extended header including a Type field indicating whether or not the transmitter makes a request for ARQ feedback polling. If the Type field indicates that the transmitter makes a request for ARQ feedback polling to the receiver, the receiving unit 4120 may receive the ARQ feedback from the receiver.

Figure 42:
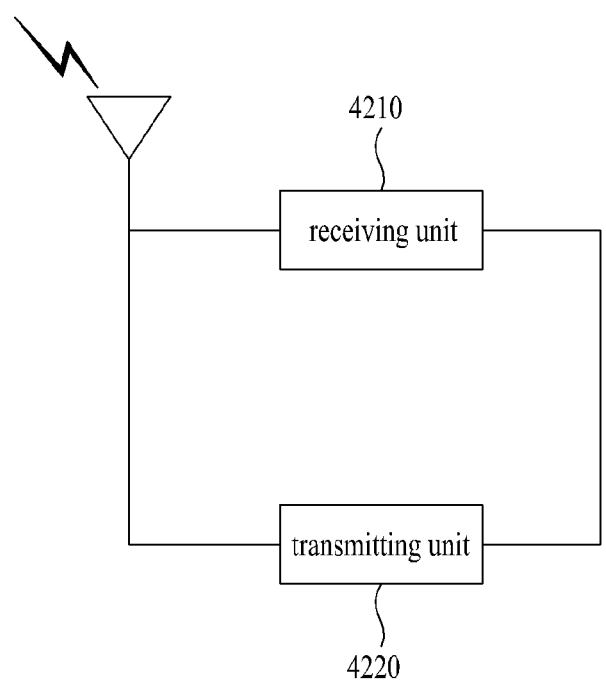
FIG. 42 is a diagram showing the configuration of a preferred embodiment of a receiver apparatus for transmitting ARQ feedback in a wireless communication system.

FIG. 42 is a diagram showing the configuration of a preferred embodiment of a receiver apparatus for transmitting an ARQ feedback in a wireless communication system.

Referring to FIG. 42, the receiver apparatus includes a receiving unit 4210 and a transmitting unit 4220. The receiving unit 4210 may receive an ARQ feedback poll for requesting ARQ feedback polling from the transmitter. The transmitting unit 4220 may transmit a PDU including an extended header including a Type field indicating whether or not the ARQ feedback is transmitted in response to the ARQ feedback polling request to the transmitter.

The embodiments of the present invention can be implemented by a variety of means, for example, hardware, firmware, software, or a combination thereof. In the case of implementing the present invention by hardware, the present invention can be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so that it can be driven by a processor. The memory unit is located inside or outside of the processor, so that it can communicate with the aforementioned processor via a variety of well-known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In addition, embodiments may be configured by combining claims which do not have an explicit citation relationship therebetween or new claims may be added by an amendment after the application.

What is claimed is:

1. A method of receiving an Automatic Repeat Request (ARQ) feedback at a transmitter in wireless communication system, the method comprising:
   transmitting a Protocol Data Unit (PDU) including an extended header that includes an ARQ feedback Polling (AFP) field or a Type field indicating whether or not the transmitter makes a request for ARQ feedback polling to a receiver; and
   receiving the ARQ feedback from the receiver when the AFP field or the Type field indicates that the transmitter makes the request for ARQ feedback polling.

2. The method according to claim 1, wherein the extended header further includes an ARQ feedback Information Element (IE) Indication (AFI) field indicating whether or not the PDU includes an ARQ feedback IE.

3. The method according to claim 2, wherein, if the AFI field is set to 1, the AFI field indicates that the PDU includes the ARQ feedback IE.

4. The method according to claim 1, wherein the extended header is a last extended header among extended headers included in the PDU.

5. The method according to claim 1, wherein the extended header is a Fragmentation and Packing Extended Header (FPEH) or an ARQ feedback Polling Extended Header (APEH).

6. The method according to claim 1, wherein the receiving the ARQ feedback comprises receiving the ARQ feedback from the receiver only when a predetermined specific condition is satisfied and the AFP field or the Type field indicates that the transmitter does not request ARQ feedback polling.

7. A method of transmitting an Automatic Repeat Request (ARQ) feedback at a receiver in a wireless communication system, the method comprising:
   receiving a Protocol Data Unit (PDU) including an extended header that includes an ARQ Feedback Polling (AFP) field or a Type field indicating whether or not a transmitter makes a request for ARQ feedback polling from the transmitter; and
   transmitting the ARQ feedback to the transmitter when the AFP field or the Type field indicates that the transmitter makes the request for ARQ feedback polling.

8. The method according to claim 7, wherein the extended header further includes an ARQ feedback Information Element (IE) Indication (AFI) field indicating whether or not the PDU includes an ARQ feedback IE.

9. The method according to claim 7, wherein, if the AFI field is set to 1, the AFI field indicates that the PDU includes the ARQ feedback IE.

10. The method according to claim 7, wherein the extended header is a last extended header among extended headers included in the PDU.

11. The method according to claim 7, wherein the extended header is a Fragmentation and Packing Extended Header (FPEH) or an ARQ feedback Polling Extended Header (APEH).

12. The method according to claim 7, wherein transmitting the ARQ feedback comprises transmitting the ARQ feedback to the transmitter only when a predetermined specific condition is satisfied and the AFP field or the Type field indicates that the transmitter does not request ARQ feedback polling.

13. A method of transmitting Automatic Repeat Request (ARQ) feedback information at a transmitter in a wireless communication system, the method comprising:
   generating a Protocol Data Unit (PDU) including a Multiplexing Extended Header (MEH) including an ARQ Feedback Information Element (IE) Indication (AFI) field and Multiplexing Extended Header Blocks (MEHBs); and
   transmitting the generated PDU to a receiver,
   wherein the AFI field indicates whether or not the PDU includes an ARQ feedback IE, and
   wherein each of the MEHBs includes information about Service Data Units (SDUs) or SDU fragments included in the same connection.

14. The method according to claim 13, wherein the each of the MEHBs includes an ARQ feedback Polling Request (APR) field indicating whether or not the transmitter requests an ARQ feedback to the receiver with respect to a corresponding connection.

15. The method according to claim 13, wherein, if the AFI field indicates that the PDU includes the ARQ feedback IE, the MEH includes the ARQ feedback IE.

16. A method of receiving an Automatic Repeat Request (ARQ) feedback at a transmitter in a wireless communication system, the method comprising:
   transmitting a Protocol Data Unit (PDU) including an extended header including a Type field indicating whether or not the transmitter makes a request for ARQ feedback polling to a receiver; and
   receiving the ARQ feedback from the receiver if the Type field indicates that the transmitter makes the request for ARQ feedback.

17. The method according to claim 16, wherein the extended header further includes a Contents field for the ARQ feedback polling request.

18. A method of transmitting an Automatic Repeat Request (ARQ) feedback at a receiver in a wireless communication system, the method comprising:
   receiving an ARQ feedback poll for requesting ARQ feedback polling from a transmitter; and
   transmitting to the transmitter a Protocol Data Unit (PDU) including an extended header including a Type field indicating whether or not the ARQ feedback is transmitted in response to the ARQ feedback polling request.

19. The method according to claim 18, wherein the extended header further includes an ARQ feedback Information Element (IE) which is includes information about the ARQ feedback.

* * * * *